Aug. 14, 1945.    J. MARTIN    2,382,325
MOUNTING OF SMALL CANNON IN THE WINGS AND THE LIKE OF AIRCRAFT
Filed March 4, 1944    3 Sheets-Sheet 1

Inventor:
JAMES MARTIN
per.
Rayner &
Attorneys

Aug. 14, 1945. J. MARTIN 2,382,325
MOUNTING OF SMALL CANNON IN THE WINGS AND THE LIKE OF AIRCRAFT
Filed March 4, 1944 3 Sheets-Sheet 2
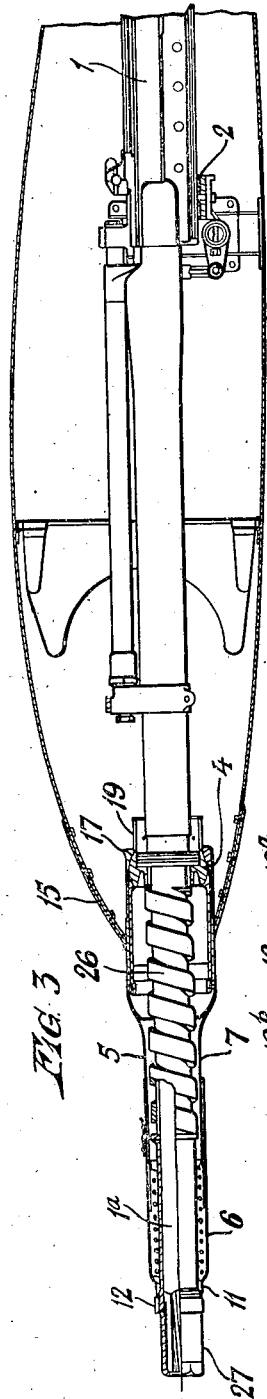
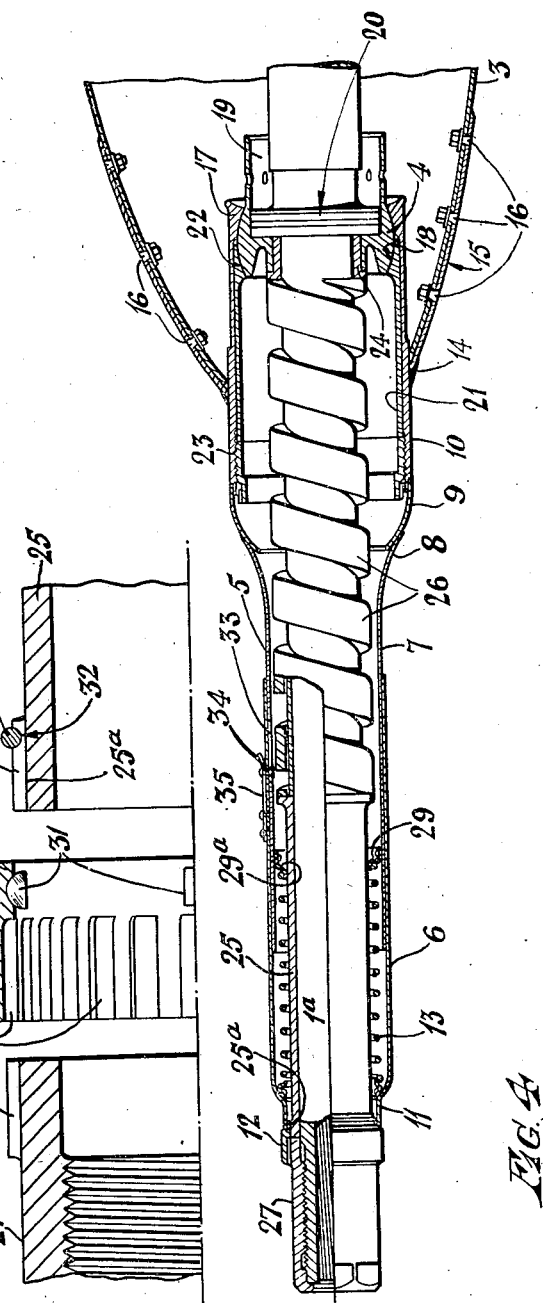
Inventor
JAMES MARTIN
per
Rayner &Co
Attorneys.

Aug. 14, 1945.  J. MARTIN  2,382,325
MOUNTING OF SMALL CANNON IN THE WINGS AND THE LIKE OF AIRCRAFT
Filed March 4, 1944  3 Sheets-Sheet 3
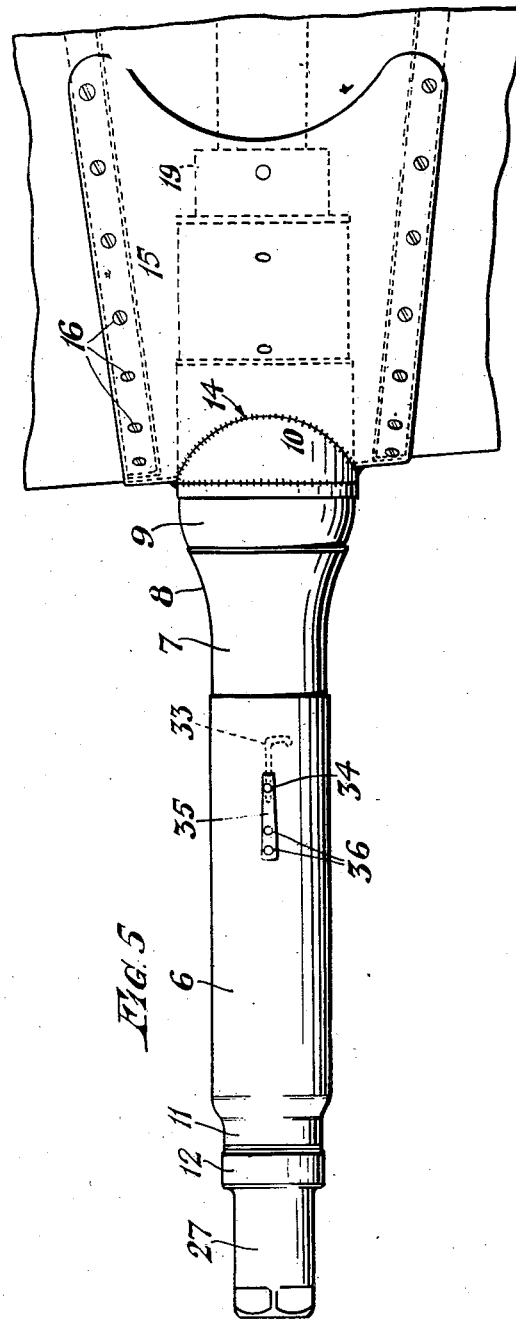
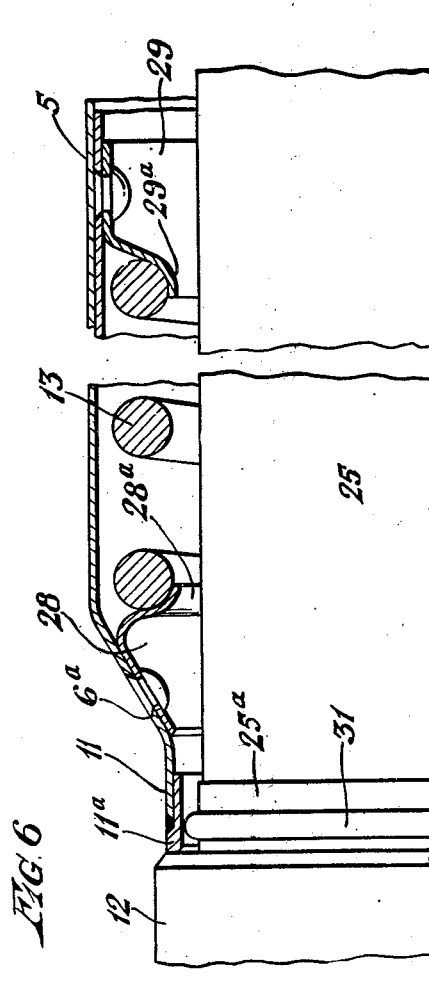
Inventor
JAMES MARTIN.
per
Rayner &o
Attorneys Patented Aug. 14, 1945

2,382,325

UNITED STATES PATENT OFFICE 2,382,325

MOUNTING OF SMALL CANNON IN THE WINGS AND THE LIKE OF AIRCRAFT

James Martin, Higher Denham, near Uxbridge, England

Application March 4, 1944, Serial No. 525,003
In Great Britain March 9, 1943

4 Claims. (Cl. 89—37.5)

This invention relates to the mounting of small cannon on the wings and like aerofoil section parts of aircraft in which the recoilable barrel extends through the leading edge of the wing or like aerofoil section member. Such cannon usually carry outside the wing a recoil spring and it is desirable to minimise air resistance and disturbance to efficient air flow due to the presence of the barrel and also to any fitting extraneous of the barrel that may be exposed outside and in proximity to the leading edge of the wing or the like, e. g. such as the said recoil spring. The chief object of this invention is to achieve this desideratum by simple and readily applied means. Another object of the invention is to provide a fairing for the exposed end of the barrel and a form of mounting for such end which will afford the minimum air resistance or interference with the aerodynamical requisites of the aircraft, and will be easy to assemble and disassemble, and still further adapts itself readily to variations in length of recoil and of projection beyond the leading edge of the wing or like part of an aeroplane.

According to this invention a tubular fairing element and spring means for positioning the tubular fairing element are provided both adapted to encircle the exposed part of the barrel, the said fairing element being adapted at one end to seat against a part of a housing unit or assembly containing the front mounting or guide of the gun or cannon barrel and being tapered so as to merge forwardly towards the periphery of the barrel and the said spring means being adapted to be interposed between the front end of the said fairing element and an abutment, e. g. the muzzle protector or a recoil damper, fitted to the front end of the barrel.

This combination of spring and fairing forms in effect a telescopic assembly adaptable to different lengths of exposed ends of barrels in such manner as to ensure a firm seating for the fairing with good streamline continuity with the aerofoil. In this connection the said spring means of the fairing can itself be enclosed in an extension of the fairing, such extension being in the form of a sheet metal or extended tube slidable along the front end of the aforesaid fairing, so that nearly the whole of the barrel is enclosed in a telescopic fairing, such fairing briefly comprising a telescopic tubular assembly shaped at one end to merge with appropriate streamline continuity into said housing accommodating the front mounting of the gun and provided with means at its other end for readily detachably locating such end in fixed relationship to the front end of the barrel, and resilient means being provided in the telescopic fairing to maintain effective continuity of the fairing from front to rear ends during normal and recoil stages.

In order that this invention may be clearly understood and readily carried into effect drawings are appended hereto illustrating embodiments thereof, and wherein, Fig. 1 is a sectional side elevation showing a simple form of the fairing device as applied to a Hispano or like type of gun barrel and in which the length of barrel projecting forwardly beyond the wing or the like is short as compared with certain other cannon mountings in aircraft.

Fig. 3 is a somewhat diagrammatic sectional side elevation showing a modification in which the fairing extends nearly the full length of the exposed part of the barrel and is telescopic.

Fig. 4 is a sectional side elevation to a larger scale than Fig. 3 and showing the front end of the barrel and the details of the said telescopic fairing.

Fig. 5 is a plan view of Fig. 4.

Fig. 6 shows in broken detail sectional side elevation and to a still larger scale the connection of the front end tubular member of the telescopic fairing to the muzzle of the barrel, and Fig. 7 is a broken upper half sectional elevation to the same scale as Fig. 6 of the fitting on the front end of the barrel.

Figure 1:
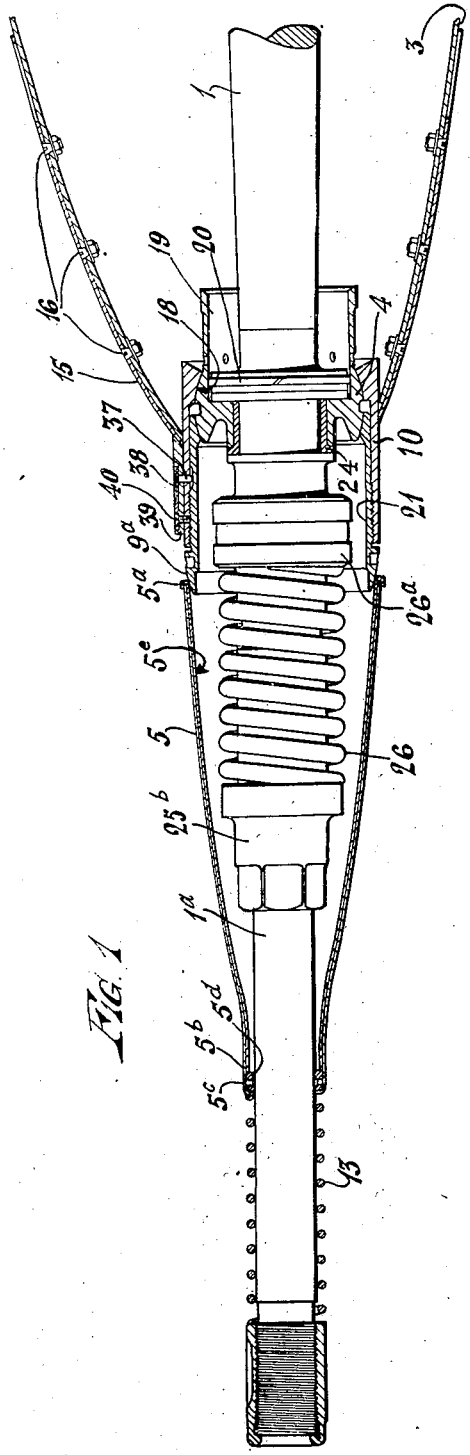
Figure 2:
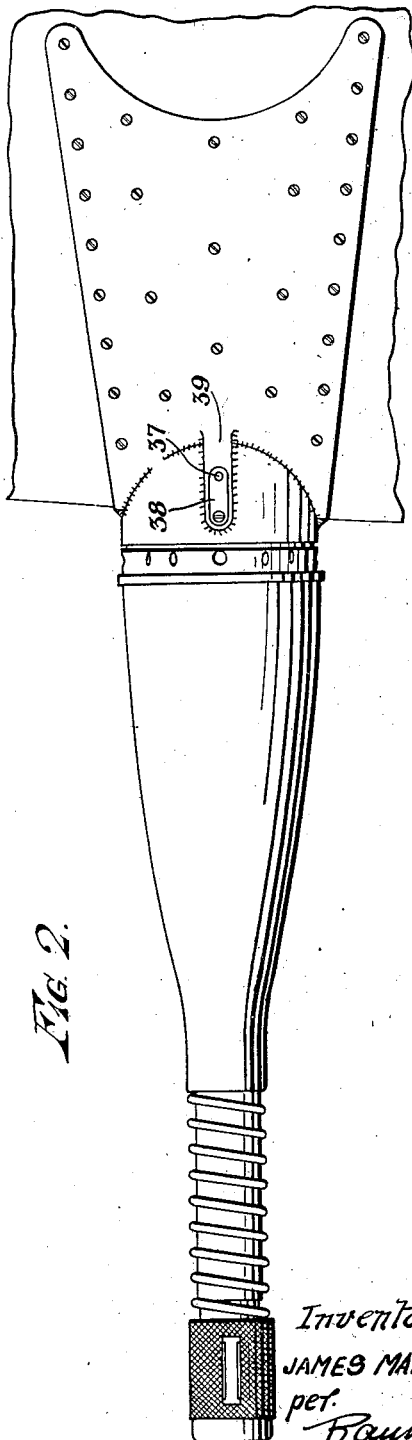
Fig. 2 is a plan view of Fig. 1.

Referring to the drawings the barrel $1^a$ of the cannon or gun 1 is guided in a universal type of front mounting 4 supported in a housing 10 mounted in the leading edge of the wing 3 the cannon being adapted to recoil in guides in a rear mounting 2 (see Fig. 3), and in the embodiment shown in Figs. 1 and 2 the fairing 5 for the front end of the barrel $1^a$ projecting beyond the housing 10 consists of an elongated somewhat ellipsoidal tube rolled or slightly flared as at $5^a$ at its rear and wider end to fit snugly over a part spherical seating $9^a$ formed on the periphery of the front end of a tube 21 screwed into the housing 10. The front end of this fairing 5 is formed with a neck $5^b$ in which is fixed by countersunk rivets $5^c$ to a bush $5^d$ making smooth sliding contact with the barrel $1^a$.

It is preferred to strengthen the fairing by constructing it of laminated form or by fitting it with a liner $5^e$ as shown in Fig. 1, thus enabling thin gauge sheet metal to be employed to facilitate the operation of spinning or otherwise shaping the metal to the most efficient streamline form. In this connection the said rolled or slightly flared larger diameter end of the fairing can be produced by curling or swaging the larger diameter or inner end of the liner 5e over the corresponding end of the outer fairing element as shown. The front end of the liner can abut against the said bush 5d.

The fairing is maintained in sealing contact with the said part spherical seating 9a by a coiled compression spring 13 interposed between the front end of the fairing and the customary muzzle protector 27, and the recoil spring 26 which is enclosed by the fairing is interposed between a collar 25b fixed to the barrel and an annular spring seating member 26a loose on the barrel and abutted by the recoil spring pressure against a bush 24 in the mounting 4.

The rear ends of the tube 21 and the housing 10 are formed with common radius part spherical seatings 22 and 17 respectively in which seats a part spherical peripheral portion 18 of the guide 4 thus enabling a compact universal joint type of front mounting to be provided in co-operation with the rear mounting 2 which preferably embodies all of the means for adjusting the cannon for harmonisation.

If desired the aforesaid compression spring 13 for the fairing can also be enclosed by suitably prolonging the fairing, in which event the fairing must be telescopic, e. g. as shown in Figs. 3 to 7 inclusive in which the fairing consists of front and rear tubes 6 and 7 respectively slidable one within the other, the rear tube 7 being flared as at 8 at its rear end to fit snugly over a part spherical nose cap 9 of a housing 10 on the leading edge of the wing accommodating the front mounting, and the other tube 6 being formed at its front end with a neck 11, such neck 11 forming a retractable sealing engagement with an abutment 12 on the front end of the barrel. The coiled compression spring 13 inside the fairing urges said two tubes 6 and 7 apart to maintain the ends of the fairing in effective sealing contact with such nose cap 9 and abutment 12 during normal and recoil conditions.

The said part spherical nose cap 9 can be a separate element fitted to an undercut front end part of the housing 10. This housing 10 can be welded as at 14 to the edge of a hole in the nose of a sheet metal spat or reinforcing plate 15 shaped to fit snugly over the leading edge of the wing 3, and conveniently secured to the skin and appropriate ribs of the wing by bolts 16 with countersunk heads.

In both embodiments illustrated the enlarged part spherical part 18 of the guide 4 is formed with a cylindrical trailing part 19 to receive a piston 20, the cylinder 19 being formed with air restricted outlet apertures to assist the return of the piston, such a device forming a damper for the recoil spring 26.

The front tube 6 of the fairing shown in Figs. 3 to 7 engages over the rear tube 7 for a substantial distance as shown in Fig. 2 to ensure adequate mutual support for the tubes and an effective seal, and the spring 13 which maintains the fairing extended is interposed between the necks of two dished or flared collars 28 and 29, the rear one 29 of which is riveted inside the inner and rear tube 7, and the other of which is riveted inside a truncated conical shoulder 6a merging into the said neck 11 at the front end of the front tube 6. The necks 28a and 29a of the said collars are suitably radiused as shown in Fig. 4 to accommodate the end convolutions of the fairing spring 13, and the neck of the front tube has welded into it a reinforcing collar 11a which abuts against the trailing rim of a retainer ring comprising the beforesaid abutment 12 and which locks the said nozzle protector 27 against unintentional unscrewing, so that the said retainer ring 12 serves the dual purpose of a locking device for the muzzle protector and an abutment for the front end of the fairing.

The said retainer ring 12 is a push fit on to the front end of the said sleeve 25 fitted on to the barrel, such front end being slightly flanged as at 25a for such purpose and formed with axially extending keyways 30 in which fit radial keys 31 engaged in a thickened rear part 12a of said retainer ring 12, the remainder of the interior of this ring being formed with axially extending flutings or serrations 12b which interengage with a correspondingly shaped rear peripherial part 27a of the muzzle protector, whereby the muzzle protector is locked against rotation. The retainer ring 12 is held against rearward axial displacement by a split ring or circlip 32 sprung into a circumferential channel 32a in the flanged front end 25a of the sleeve 25 fitted to the barrel, axial displacement forwardly being prevented by the retainer ring abutting against the rear end of the serrated part of the muzzle protector 27.

The said circlip 32 is normally covered by the reinforcing collar 11a of the neck 11 of the front end of the fairing so it is securely held in position, but if it is required to remove the muzzle protector, e. g. as a preliminary operation to withdrawing the barrel rearwardly through the front mounting, this circlip 32 is exposed for removal by retracting the front tube 6 of the fairing against the influence of the fairing spring 13 and temporarily locking such tube in the retracted position. This temporary locking is effected by any suitable means, a most convenient means comprising a bayonet joint the L shaped slot 33 of which is formed in the front end of the rear tube 7 receiving a pin 34 projecting inwardly from the front tube. This pin is preferably carried by the free end of a leaf spring 35 fixed by rivets 36 along the exterior of the front tube. The length of the longitudinal limb of the L shaped slot 33 is greater than the recoil of the gun.

Means may be provided to automatically lock and correctly position the tube 21 formed with the seating 22 to ensure the maintenance of proper contact of the seatings 22 and 17 with the part spherical guide member 4, a suitable means being shown in Figs. 1 and 2 and comprising a detent 37 carried by one end of a spring finger 38 fixed at its other end to a lug 39 by means of a screw 40, said lug being welded to the spat 15 and to the housing 10, the detent passing freely through the housing and engaging in a recess 41 in the periphery of the tube 21.

What I claim is:

1. In an airplane having an aerofoil section, the combination of, a cannon mounting in said section, a cannon mounted thereon with the barrel of the cannon projecting outside said section, an abutment on the free end of said barrel, a fairing having a streamlined configuration closely surrounding and enclosing that part of the projection of said barrel which is adjacent the aerofoil section, one end of said fairing seated on said cannon mounting and a coil spring surrounding said barrel and disposed between the free end of said fairing and the abutment on said barrel.

2. In an airplane having an aerofoil section, the combination of, a cannon mounting in said section, a cannon mounted thereon with the barrel of the cannon projecting outside said section, an abutment on the free end of said barrel, the fairing comprises telescoping tubes closely surrounding and enclosing said barrel projection, one end of said fairing seated on said cannon mounting, the coiled compression spring surrounding said barrel and disposed and arranged to normally urge said telescopic tubes apart.

3. A combination as recited in claim 1 in which the cannon mounting has a spherical front end exposed through a leading edge of said aerofoil section, and that end of said fairing which is adjacent said section is flared to conform to and engage said spherical end of said cannon mounting.

4. A combination as recited in claim 2 in which means are provided to temporarily lock the telescopic fairing in a predetermined retracted position.

JAMES MARTIN.